UNITED STATES PATENT OFFICE 2,036,701

PRODUCTION OF MIXED FERTILIZER

Carl Kircher and Karl Otto Schmitt, Ludwigshafen-on-the-Rhine, Germany, assignors to I. G. Farbenindustrie Aktiengesellschaft, Frankfort-on-the-Main, Germany No Drawing. Application April 5, 1932, Serial No. 603,442. In Germany April 15, 1931

4 Claims. (Cl. 71—9)

The present invention relates to the production of mixed fertilizers containing ammonium nitrate.

Ammonium nitrate cannot be used as such for fertilizing purposes in view of its high hygroscopicity and its explosibility. It is therefore customary to mix ammonium nitrate with other substances in order to improve its properties. For this purpose preferably such additional substances are used as have themselves fertilizing properties and which accordingly are capable of supplying further plant nutrients. Use is made, for example, of the ammonium phosphate or of potassium salts. When compounding ammonium nitrate with ammonium phosphates, the ammonium nitrate is usually prepared in a solid form or in the form of an aqueous solution or highly concentrated melt with which the other ingredients of the mixture are then incorporated. This method of working is attended with the disadvantage that the production of solid ammonium nitrate or the treatment of highly concentrated ammonium nitrate melts offer certain difficulties when operating on an industrial scale, as for example decomposition of ammonium nitrate caused by the presence of such impurities as chlorides and iron compounds, whereas the use of dilute ammonium nitrate solutions has the disadvantage that much heat energy is required for evaporating the water of the solution in order to obtain a dry product. It has also been proposed to add nitric acid to acid solutions containing phosphates and then to neutralize the mixture by means of ammonia but this method of working has the disadvantage that strongly acid solutions are used which strongly attack the vessels used for the conversion especially at the comparatively high temperatures required for a complete utilization of the heat of neutralization.

According to the present invention the aforesaid disadvantages of the known processes are avoided. The process according to the present invention consists in starting from a neutral or alkaline solution of an ammonium phosphate which may contain ammonium nitrate and then producing in this solution ammonium nitrate in addition to that which may originally be present in the solution, while continuously maintaining in the solution a hydrogen-ion concentration not greater than $10^{-4.5}$ and preferably between $10^{-7}$ and $10^{-5}$. It is obvious that the initial solutions used according to the present invention must have a hydrogen-ion concentration not greater than $10^{-7}$ and accordingly must contain the ammonium phosphate in the form of diammonium or triammonium phosphate or mixtures of these substances with each other or with mono-ammonium phosphate. The ammonium nitrate is produced in the solution by the introduction of nitric acid or of gases containing higher oxides of nitrogen which react with the water of the solution with the formation of nitric acid. In case so large amounts of nitric acid or the like are to be introduced into the solution that the reaction liquid would become strongly acid, ammonia must be introduced at the same time either continuously or periodically.

The solutions used according to the present invention may also contain other substances having fertilizing properties as for example potassium salts or suitable salts of sodium, calcium or magnesium. Such salts, however, may also be added in the course of or after the production of the ammonium nitrate in the solution and in this way mixed fertilizers may be produced which contain all essential plant nutrients, that is so-called complete fertilizers.

The process according to the present invention may be carried out, for example, by the introduction of nitric acid or gases containing higher nitrogen oxides into strongly ammoniacal ammonium phosphate solutions which may, if so desired, contain undissolved triammonium phosphate as the solid phase. In such treatment it may happen that ammonia is disengaged during the neutralization resulting in the formation of ammonium nitrate. In that case the waste gases are preferably introduced into fresh phosphoric acid, whereby ammonium phosphates are formed in the acid which is then utilized for the preparation of a further batch of the mixed fertilizers.

The process according to the present invention may be carried out as a continuous operation for which purpose, for example, nitric acid which may contain potassium salts, is brought together with such amounts of basic ammonium phosphates that the resulting solution or crystal pulp does not contain free acid, whereupon, if so desired, the mixture may be further brought to reaction with ammonia or ammonium carbonate.

If the products obtained according to the present invention are to contain a large proportion of combined ammonia it may be advantageous to carry out the production of the ammonium nitrate in the solution under elevated pressure, preferably under a pressure of ammonia gas.

The process according to the present invention constitutes a very simple method of cheaply producing mixed fertilizers containing ammonia nitrogen as well as nitrate nitrogen, without the preparation of ammonium nitrate in the solid state or in the form of a highly concentrated solution or melt being necessary, while avoiding the formation of strongly acid solutions containing both phosphoric acid and nitric acid which would attack the apparatus used. The process according to the present invention has the further advantage that the heat of neutralization disengaged in the production of the ammonium nitrate in the solution can be utilized directly especially for more or less completely evaporating the water of the solution so that a dry product is obtained without difficulty. The mixed fertilizers produced according to the present invention are at least equal and often superior to the corresponding products which have been obtained by mixing the ingredients in the solid state or in the form of melts.

The process according to the present invention is applicable to the production of mixed fertilizers containing ammonium nitrate and ammonium phosphate in any desired proportion. Most suitably from 0.3 to 5 parts, and preferably from 0.6 to 1.8 parts, by weight, of ammonium phosphate should be present in the products for each part by weight of ammonium nitrate. The proportions of the ingredients which must be used for the production of such products, vary of course with the circumstances of each particular case, but can be calculated without any difficulty from the chemical equations representing the reactions involved.

The following example will further illustrate how this invention may be carried out in practice but this example illustrates only a preferred form of the invention which is in no way limited thereto. The parts are by weight.

Example 500 parts of a solution containing 16 per cent of diammonium phosphate and 24 per cent of triammonium phosphate and 135 parts of nitric acid of 98 per cent (by weight) strength are run into an evaporating pan in the course of 15 minutes. By the heat of neutralization the solution becomes heated to about 80° C. so that only comparatively small amounts of heat need be supplied for then evaporating about 225 parts of water. Thereupon about 15 parts of gaseous ammonia are introduced into the solution whereby a melt is formed which on cooling directly solidifies to a solid stable product. 375 parts of a product are obtained which contain 100 parts of nitrogen and 100 parts of $P_2O_5$. If necessary, the product may be submitted to an after-treatment for drying.

What we claim is:

1. The process of producing mixed fertilizers which comprises introducing nitric acid into an ammonium phosphate solution initially having a hydrogen-ion concentration not exceeding $10^{-7}$, while continuously maintaining in the solution a hydrogen-ion concentration not exceeding $10^{-4.5}$, thereby forming ammonium nitrate in the solution.

2. The process of producing mixed fertilizers which comprises introducing nitric acid into an ammonium phosphate solution initially having a hydrogen-ion concentration not exceeding $10^{-7}$, while continuously maintaining in the solution a hydrogen-ion concentration between $10^{-7}$ and $10^{-5}$, thereby forming ammonium nitrate in the solution.

3. The process of producing mixed fertilizers which comprises introducing nitric acid into an ammonium phosphate solution initially having a hydrogen-ion concentration not exceeding $10^{-7}$, while continuously maintaining in the solution a hydrogen-ion concentration not exceeding $10^{-4.5}$, thereby forming ammonium nitrate in the solution, the proportions of the reagents being calculated to produce a product containing between 0.3 and 5 parts, by weight, of ammonium phosphate for each part of ammonium nitrate.

4. The process of producing mixed fertilizers which comprises introducing nitric acid in to an ammonium phosphate solution initially having a hydrogen-ion concentration not exceeding $10^{-7}$, while continuously maintaining in the solution a hydrogen-ion concentration not exceeding $10^{-4.5}$, thereby forming ammonium nitrate in the solution, the proportions of the reagents being calculated to produce a product containing between 0.6 and 1.8 parts, by weight, of ammonium phosphate for each part of ammonium nitrate.

CARL KIRCHER.
KARL OTTO SCHMITT.